United States Patent
Marchetti

(10) Patent No.: US 11,838,075 B2
(45) Date of Patent: Dec. 5, 2023

(54) SYSTEM AND METHODS OF EMPLOYING DATA OVER POWER IN AIRCRAFT

(71) Applicant: Gulfstream Aerospace Corporation, Savannah, GA (US)

(72) Inventor: John A. Marchetti, Savannah, GA (US)

(73) Assignee: Gulfstream Aerospace Corporation

( * ) Notice: Subject to any disclaimer, the term of this patent is extended or adjusted under 35 U.S.C. 154(b) by 0 days.

(21) Appl. No.: 18/055,194

(22) Filed: Nov. 14, 2022

(65) Prior Publication Data

US 2023/0071330 A1 Mar. 9, 2023

Related U.S. Application Data

(63) Continuation of application No. 16/948,567, filed on Sep. 23, 2020, now Pat. No. 11,533,080.

(60) Provisional application No. 62/907,140, filed on Sep. 27, 2019.

(51) Int. Cl.
*B64D 41/00* (2006.01)
*H04B 3/54* (2006.01)

(52) U.S. Cl.
CPC ............... *H04B 3/54* (2013.01); *B64D 41/00* (2013.01)

(58) Field of Classification Search
CPC ............... H04B 3/54; H04B 2203/547; H04B 2203/5416; H04B 2203/5445; H04B 3/542; H04B 3/548; B64D 41/00; B64D 11/0624

See application file for complete search history.

(56) References Cited

U.S. PATENT DOCUMENTS

| | | | |
|---|---|---|---|
| 5,210,519 A | 5/1993 | Moore | |
| 5,818,127 A | 10/1998 | Abraham | |
| 7,689,327 B2 | 3/2010 | Loda | |
| 10,065,583 B2 | 9/2018 | Carleial et al. | |
| 2010/0110900 A1* | 5/2010 | Kim | H04L 1/24 370/242 |
| 2013/0003756 A1 | 1/2013 | Mitchell et al. | |

(Continued)

FOREIGN PATENT DOCUMENTS

| | | |
|---|---|---|
| EP | 1487128 A1 | 12/2004 |
| EP | 3241748 A1 | 11/2017 |
| GB | 2410481 A | 8/2005 |

OTHER PUBLICATIONS

Analog Devices, High Performance, Sub GHZ Radio Transceiver IC, ADF7030-1, Data Sheet, Norwood MA, 2016.

*Primary Examiner* — Lincoln D Donovan
*Assistant Examiner* — Alex W Lam
(74) *Attorney, Agent, or Firm* — LKGlobal | Lorenz & Kopf LLP

(57) ABSTRACT

A system and method is provided for data over power in an aircraft that includes a direct current power source for providing power over power lines to devices onboard the aircraft and a data injector coupled to the power lines for digitally modulating radio frequency data onto twisted pair data over power lines to provide data and power to the devices. A controller is coupled to the direct current power source and the data injector for providing the data to digitally modulate the radio frequency onto the twisted pair data over power lines such that power for the devices onboard the aircraft and data for control of the device onboard the aircraft are provided to the devices onboard the aircraft over the twisted pair data over power lines.

20 Claims, 4 Drawing Sheets

(56) References Cited

U.S. PATENT DOCUMENTS

2017/0093230 A1 3/2017 Yundt et al.
2018/0097641 A1* 4/2018 Byrne ..................... H02H 3/04

* cited by examiner

SYSTEM AND METHODS OF EMPLOYING DATA OVER POWER IN AIRCRAFT

RELATED APPLICATIONS

This application is a continuation of U.S. patent application Ser. No. 16/948,567, filed Sep. 23, 2020 and issued on Dec. 20, 2022 as U.S. Pat. No. 11,533,080, which claims the benefit of U.S. Provisional Application No. 62/907,140 filed Sep. 27, 2019.

TECHNICAL FIELD

The present invention generally relates to aircraft, and more particularly relates to employing data over power applications in aircraft.

BACKGROUND

Contemporary our business aircraft have nearly the same or similar electrical systems as a commercial aircraft at a fraction of the size. Trying to integrate all the electrical systems in a smaller space is a substantial challenge. For example, the Gulfstream G650, had an increase in wire weight of 133 pounds over its predecessor, the G550. Wiring segments increased by 30% from the previous airframe, and if this trend continues it is possible that future designs will increase by 25% every 5 years. As the demand for more products and conveniences grows, the space needed for the new hardware and the wiring to accommodate it, becomes increasingly prohibitive.

Accordingly, it is desirable to provide systems and methods for employing data over power in aircraft. Furthermore, other desirable features and parameters of the present invention will become apparent from the subsequent detailed description of the invention and the appended claims, taken in conjunction with the accompanying drawings and this background of the invention.

SUMMARY

Various non-limiting embodiments of employing data over power in aircraft are disclosed herein.

In one embodiment, a system is provided for data over power in an aircraft that includes a direct current power source for providing power over power lines to devices onboard the aircraft and a data injector coupled to the power lines for digitally modulating data onto twisted pair data over power lines to provide data and power to the devices. A controller is coupled to the direct current power source and the data injector for providing the data to be digitally modulated onto the twisted pair data over power lines such that power for the devices onboard the aircraft and data for control of the device onboard the aircraft are provided to the devices onboard the aircraft over the twisted pair data over power lines.

In another embodiment, a method for providing data over power is provided. The method includes digitally modulating data on twisted pair direct current power lines via frequency shift keying or some other form of RF modulation in the frequency band of 70-180 MHz to provide both data and power to the devices onboard the aircraft.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Data over power applications for aircraft are described herein and generally achieve a reduction in wire weight and cost over conventional aircraft. Although data over power applications are discussed herein as a component of an aircraft, the configurations and algorithms described for operation of the data over power may be applicable to other vehicles, such as submarines or automobiles.

Figure 1:
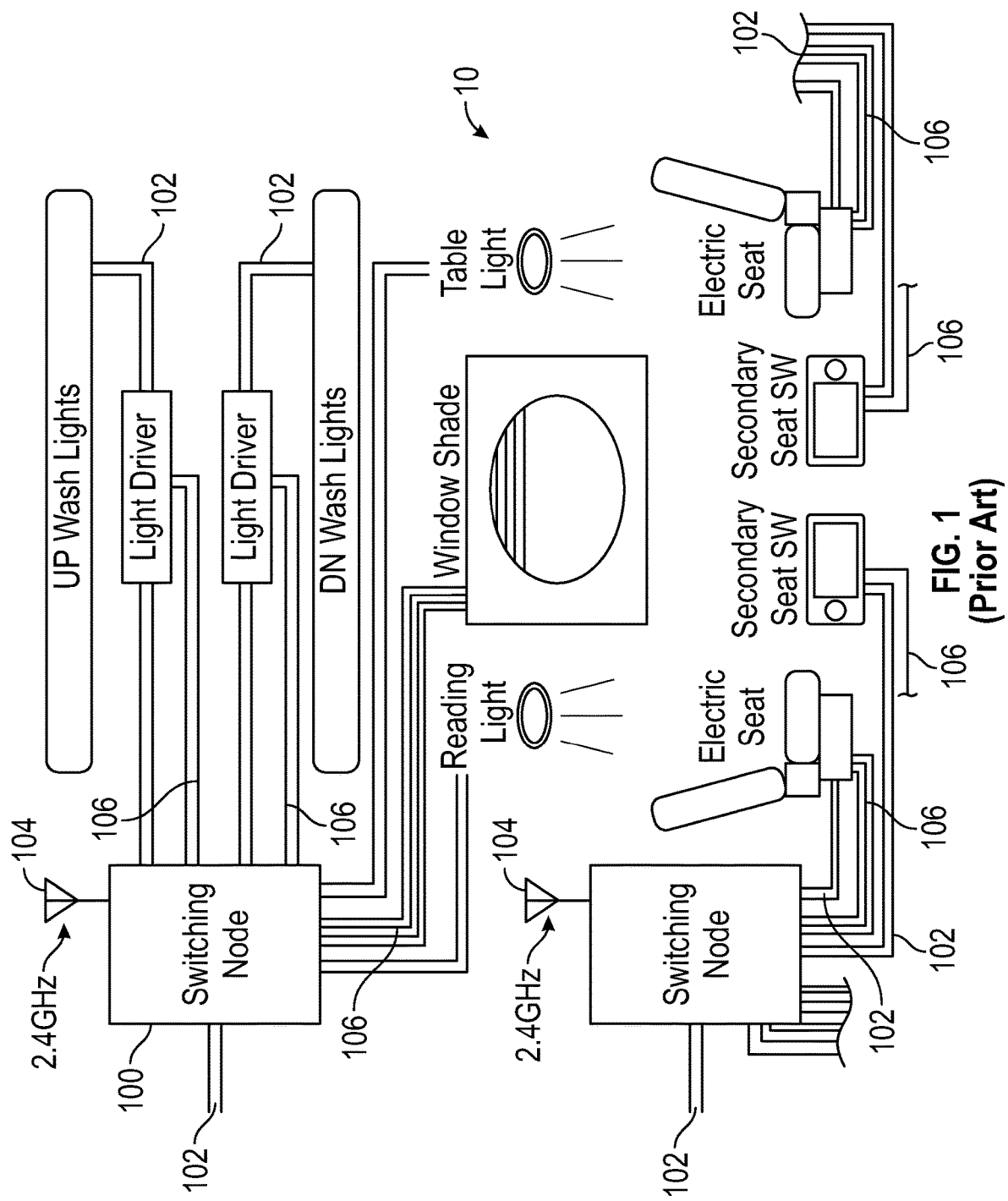
FIG. 1 is a simplified schematic view illustrating data and power switching in accordance with conventional techniques.

FIG. 1 is a simplified schematic view illustrating data and power switching in accordance with conventional techniques aboard an aircraft 10. A switching node 100 (also known as a Modular Power Tile) receives power 102 and communicates data (e.g., sensors, switch settings) via a transceiver 104. Power 102 and data/sensor lines 106 couple to each device for the safety and comfort of the aircraft passengers. In nonlimiting embodiments, these devices include, but are not limited to, passenger seats, table lights, reading lights, and cabin lighting, including, but not limited to, galley lighting, cabin lighting, up-wash accent lighting, down-wash accent lighting and window shades.

Figure 2:
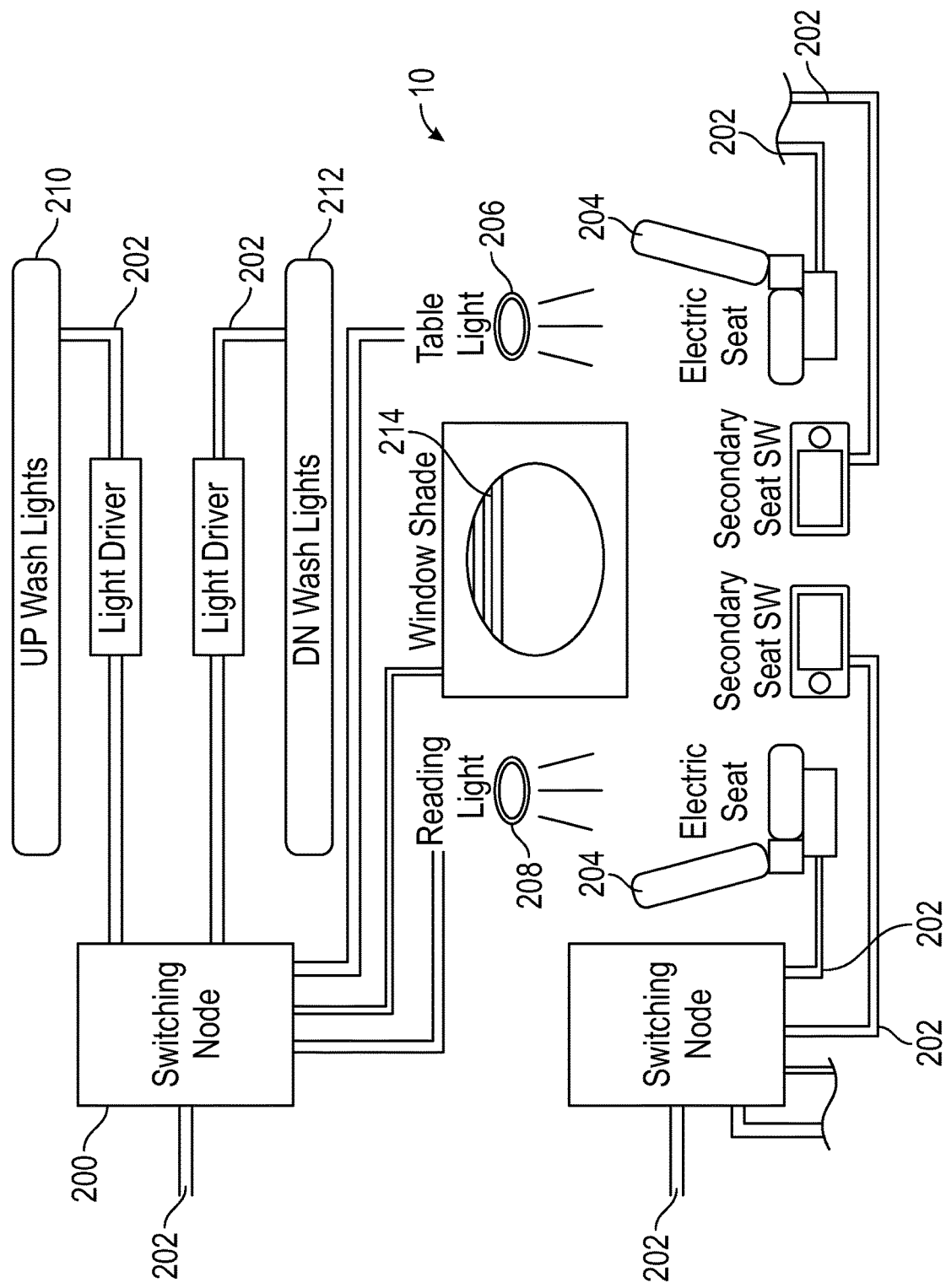
FIG. 2 is a simplified schematic view illustrating data over power in accordance with the teachings of the present disclosure.

FIG. 2 is a simplified schematic view illustrating data and power switching in accordance with the teachings of the present disclosure aboard aircraft 10. A switching node 200 (also known as a Modular Power Tile) receives data over power 202 and communicates such to each device resulting in a greater than twenty percent reduction in wiring. That is, as compared to FIG. 1, the data/sensor lines 106 are removed as all data/sensor communication is achieved via (over) the power lines 102. In nonlimiting embodiments, these devices include, but are not limited to, passenger seats 204, table lights 206, reading lights 208, and cabin lighting, including, but not limited to, galley lighting, cabin lighting, up-wash accent lighting 210, down-wash accent lighting 212 and window shades 214.

A challenge in implementing a data over power application are the high current requirements of some of the powered devices. For example, passenger seats 204 typically require current in excess of ten amps which may make the size of the inductors needed to isolate the network infeasible. High current application can also be implement using well shielded radiofrequency (RF) coax cables, but such cables are not typically used in power applications on aircraft. Typically, contemporary aircraft cabin wiring employs 28 VDC power and ground lines, but these lines are not typically balanced making the addition of higher frequency data communication a challenge. At higher data frequencies, increased crosstalk and energy radiation can become an issue. Furthermore, impedance mismatch intolerance limits the data frequency that can be employed. Another complication arises in that the aviation COM/NAV frequency band (110-139 MHz) must be avoided for data over power applications.

As will be discussed in detail below in connection with FIG. 3 and FIG. 4, to overcome these challenges, the present disclosure contemplates employing twisted pair power/ground lines to provide a balanced network and frequency shift keying (FSK) or some other form of digital RF modulation to modulate the data over the power lines in the frequency range of 70-180 MHz, while avoiding the 110-130 MHz COM/NAV frequency band.

Figure 3:
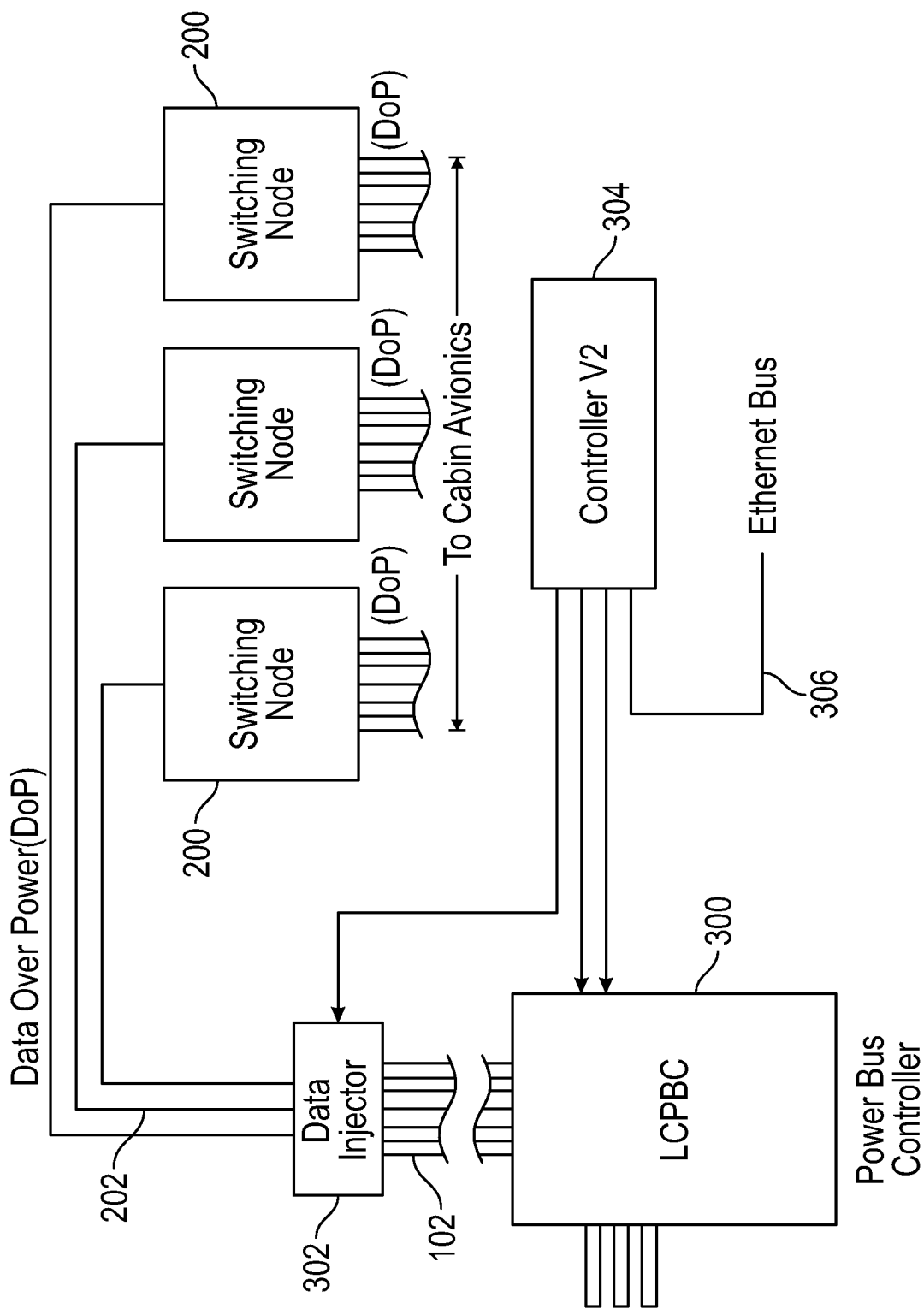
FIG. 3 is a block diagram illustrating a non-limiting embodiment of data over power in an aircraft in accordance with the teachings of the present disclosure.

FIG. 3 a block diagram illustrating a non-limiting embodiment of data over power in an aircraft 10 in accordance with the teachings of the present disclosure. A power bus controller 300 (also known as a Large Cabin Power Bus Controller (LCPBC)) distributes power via power lines 102 to a data injector 302. The power bus controller 300 and the data injector 302 are coupled to a controller 304, that receives data for the various cabin devices (e.g., light on, light off, light intensity, window shade position) via an Ethernet (or similar) data bus 306. The data injector 302 incorporates the data over the power lines 202 to the switching nodes 200 for distribution to the various cabin devices (e.g., seats and lights, see FIG. 2).

Figure 4:
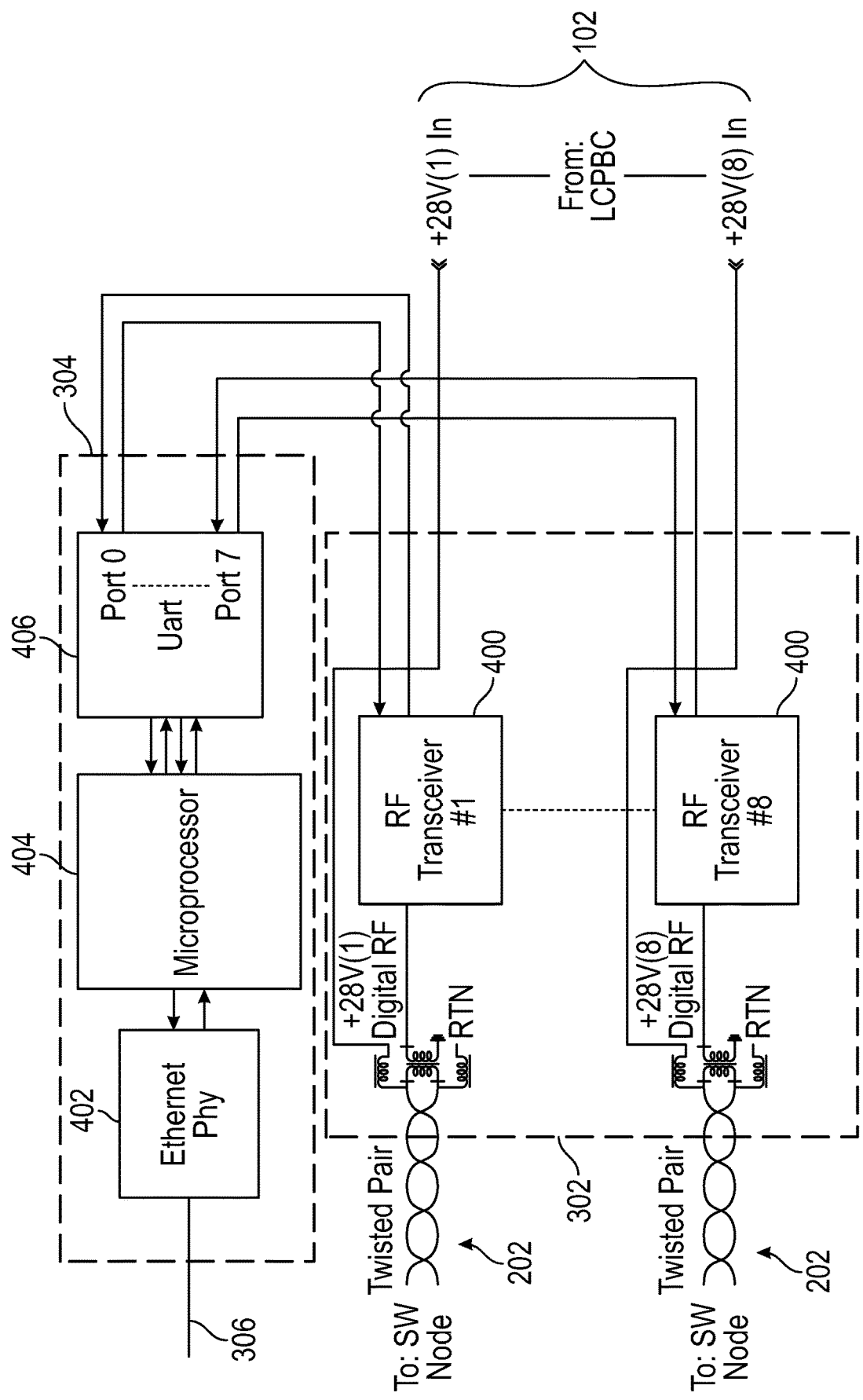
FIG. 4 is a simplified schematic diagram of the data injector of FIG. 3.

FIG. 4 is a simplified schematic diagram of the data injector 302 and controller 304 of FIG. 3. In exemplary embodiments, a sub-1 GHz transceiver 400 is employed in the data injector 302 to frequency-shift-key (FSK) binary phase-shift-keying (BPSK), or gaussian minimum-shift-keying (GMSK) or other digital RF modulation technique to modulate data onto the power lines. In some embodiments, an Analog Devices ADF7030-1 integrated circuit may be employed as sub-1 GHz transceiver 400. In some embodiments a frequency band of approximately 169 MHz is used that is well within the preferred frequency range of 70-180 MHz while avoiding the 110-130 MHz COM/NAV frequency band. In fundamental embodiments, the data over power lines 202 are twisted pair 28 VDC power lines, which in some embodiments are configured to carry current in excess of one amp (e.g., such as for powering passenger seats 204, see FIG. 2).

The sub-1 GHz transceiver(s) 400 are controlled by the controller 304 that receives data to be provided to the cabin device via an ethernet network 306. The ethernet data 306 is received by an ethernet interface 402 and the data is processed by a processor 404 and provided to one (or as many as desired in any particular realization) sub-1 GHz transceiver 400 of the data injector 302.

In this way, the present disclosure provides data over power to cabin devices using a hybrid arrangement of digitally modulated RF data, DC power and twisted pair data over power lines that can support current in excess of one amp while substantially reducing wire weight about an aircraft. Additionally, susceptibility to RF interference (e.g., from microwave oven) is reduced (or eliminated) supporting low latency data rates over the power lines.

In the example provided, while at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth herein.

What is claimed is:

1. A system for data-over-power in an aircraft having powered aircraft devices, the system comprising:
    means for obtaining direct current power for use by the powered aircraft devices;
    means for receiving the direct current power and for digitally modulating radio frequency data onto twisted pair data-over-power lines, such that the twisted pair data-over-power lines provide control data and the direct current power to the powered aircraft devices; and
    means for providing the control data to be digitally modulated by the means for receiving;
    wherein the means for obtaining, the means for receiving, and the means for providing are onboard the aircraft; and
    wherein the twisted pair data-over-power lines supply the direct current power to operate the powered aircraft devices, and to communicate the control data to control operation of the powered aircraft devices.

2. The system of claim 1, wherein the means for obtaining comprises at least one controller onboard the aircraft.

3. The system of claim 2, wherein the at least one controller comprises a power bus controller.

4. The system of claim 1, wherein the means for receiving the direct current power and for digitally modulating radio frequency data comprises a data injector onboard the aircraft.

5. The system of claim 4, further comprising one or more switching nodes coupled to the data injector via the twisted pair data-over-power lines and to the devices onboard the aircraft.

6. The system of claim 1, wherein the means for providing comprises at least one controller onboard the aircraft.

7. An aircraft comprising:
    a powered aircraft device;
    at least one controller; and
    at least one data-over-power line coupled between the at least one controller and the powered aircraft device;
    the at least one controller configured to:
        provide direct current power for use by the powered aircraft device;
        receive control data to be provided to the powered aircraft device; and
        digitally modulate the received control data onto the at least one data-over-power line, such that the at least one data-over-power line provides the control data and the direct current power to the powered aircraft device;
    wherein the at least one data-over-power line supplies the direct current power to operate the powered aircraft device, and communicates the control data to control operation of the powered aircraft device.

8. The aircraft of claim 7, wherein the at least one controller includes or cooperates with a data injector that digitally modulates the control data into radio frequency data carried by the at least one data-over-power line.

9. The aircraft of claim 8, wherein the data injector employs frequency shift keying to digitally modulate the control data.

10. The aircraft of claim 7, wherein the data injector utilizes a frequency band of 70-180 MHz to digitally modulate the control data.

11. The aircraft of claim 10, wherein the frequency band of 70-180 MHz excludes the frequency band of 110-130 MHz.

12. The aircraft of claim 7, wherein the powered aircraft device comprises one or more of the set of devices: passenger seats, table lighting, seat lighting, accent lighting and window shades.

13. The aircraft of claim 7, wherein the at least one data-over-power line comprises a twisted pair data-over-power line.

14. The aircraft of claim 7, further comprising a switching node coupled between the at least one controller and the power aircraft device.

15. The aircraft of claim 7, wherein the at least one controller comprises a 28 VDC direct current power supply.

16. A system onboard an aircraft having powered aircraft devices, the system comprising:
 a source of control data intended for the powered aircraft devices;
 a direct current (DC) power supply; and
 at least one processor configured to perform or control operations including:
  obtaining DC power from the DC power supply, for use by the powered aircraft devices;
  process control data received from the source of control data; and
  digitally modulate radio frequency data onto data-over-power lines, such that the data-over-power lines provide the control data and the DC power to the powered aircraft devices;
 wherein the data-over-power lines supply the DC power to operate the powered aircraft devices, and to communicate the control data to control operation of the powered aircraft devices.

17. The system of claim 16, wherein the DC power supply comprises a power bus controller.

18. The system of claim 16, further comprising one or more switching nodes coupled between the data-over-power lines and the devices onboard the aircraft.

19. The system of claim 16, wherein the data-over-power lines are twisted pair data-over-power lines.

20. The system of claim 16, wherein the DC power supply comprises a 28 VDC direct current power supply.

* * * * *